United States Patent
Goodno (10) Patent No.: US 9,362,710 B1
(45) Date of Patent: Jun. 7, 2016

(54) MULTICHANNEL CONTROLLER

(71) Applicant: Northrop Grumman Systems Corporation, Falls Church, VA (US)

(72) Inventor: Gregory D. Goodno, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/789,490

(22) Filed: Jul. 1, 2015

(51) Int. Cl.
*H01S 3/067* (2006.01)
*H01S 3/10* (2006.01)
*G05B 11/18* (2006.01)
*G05B 15/02* (2006.01)
*G05B 13/02* (2006.01)
*H01S 3/23* (2006.01)

(52) U.S. Cl.
CPC ......... *H01S 3/10015* (2013.01); *H01S 3/06754* (2013.01); *H01S 3/10053* (2013.01); *H01S 3/10069* (2013.01); *H01S 3/2308* (2013.01); *H01S 3/2383* (2013.01); *G05B 11/18* (2013.01); *G05B 13/024* (2013.01); *G05B 15/02* (2013.01)

(58) Field of Classification Search
CPC ............ H01S 3/06754; H01S 3/10015; H01S 3/10053; G05B 11/00; G05B 13/024; G05B 13/025; G05B 15/02
See application file for complete search history.

(56) References Cited

U.S. PATENT DOCUMENTS

| | | | |
|---|---|---|---|
| 6,708,003 B1 | 3/2004 | Wickham et al. | |
| 7,058,098 B1 | 6/2006 | Shay | |
| 8,159,737 B2 | 4/2012 | Martin et al. | |
| 8,605,761 B2 | 12/2013 | Hutchin | |
| 2002/0163960 A1* | 11/2002 | Blodgett | G05B 5/01 375/232 |
| 2013/0315271 A1* | 11/2013 | Goodno | H01S 3/1307 372/31 |
| 2013/0336344 A1* | 12/2013 | Palese | H01S 3/1301 372/20 |
| 2014/0036350 A1 | 2/2014 | Fermann et al. | |

OTHER PUBLICATIONS

Hati, A. et al; Cancellation of Vibration-Induced Phase Noise in Optical Fibers; Photonics Technology Letters, IEEE , vol. 20, No. 22; pp. 1842-1844, Nov. 15, 2008.
Su, R. et al; High Power Narrow-Linewidth Nanosecond All-Fiber Lasers and their Actively Coherent Beam Combination; Selected Topics in Quantum Electronics, IEEE Journal of , vol. 20, No. 5; pp. 206-218; Sep.-Oct. 2014.

(Continued)

*Primary Examiner* — Eric Bolda
(74) *Attorney, Agent, or Firm* — Patti & Malvone Law Group, LLC (57) ABSTRACT

An output characteristic of a monotonic system is controlled using a plurality of adjustable inputs. The adjustments are controlled using a set of setpoints and a set of dither magnitudes. Each input's adjustment is controlled simultaneously using a setpoint and a dither around the setpoint. The dither values for each input have a zero mean and there is zero correlation between the dithers applied to different inputs. The changes in the output characteristic that result from the dithers are measured, and are used to create an adjustment value. The adjustment value is used to create a set of adjusted dither magnitudes. The set of adjusted dither magnitudes are added to a set of integrated prior adjusted dither magnitudes to create a set of setpoint adjustments. Adding the setpoint adjustments to corresponding setpoints creates a set of updated setpoints. This process is repeated so that the setpoints converge on a value that maximizes the output characteristic being controlled.

20 Claims, 3 Drawing Sheets

(56) References Cited

OTHER PUBLICATIONS

Lombard, L. et al; Coherent beam combining performance in harsh environment; Proc. SPIE 8961; Fiber Lasers XI: Technology, Systems, and Applications, pp. 896107-1 through 896107-9; Mar. 12, 2014.

Filimonov, G. A. et al; Performance analysis of a coherent tiled fiber-array beam director with near-field phase locking and programmable control of tip/tilt and piston phases; Proc. SPIE 8971, Free-Space Laser Communication and Atmospheric Propagation XXVI; pp. 897109-1 through 897109-6; Mar. 6, 2014.

Ma, P. et al; Coherent Polarization Beam Combining of Four High-Power Fiber Amplifiers Using Single-Frequency Dithering Technique; Photonics Technology Letters, IEEE , vol. 24, No. 12; pp. 1024-1026; Jun. 15, 2012.

Kansky, J. E. et al; Beam control of a 2D polarization maintaining fiber optic phased array with high-fiber count; Proc. SPIE vol. 6306, Advanced Wavefront Control: Methods, Devices, and Applications IV; pp. 63060G-1 through 63060G-11; Aug. 29, 2006; doi: 10.1117/12.680571.

Augst, S. J. et al; Beam combining of ytterbium fiber amplifiers; Optical Society of America; JOSA B. vol. 24, No. 8; pp. 1707-1715; Aug. 2007.

Pulford, B. N.; LOCSET Phase Locking: Operation, Diagnostics, and Applications; Ph. D. dissertation; University of New Mexico, 2011; p. 142; 218 pages; Dec. 2011.

Azarian, A. et al; Orthogonal coding methods for increasing the number of multiplexed channels in coherent beam combining; Applied Optics; pp. 1493-1502; Jan. 2014.

Goodno, G.D. et al; Brightness-Scaling Potential of Actively Phase-Locked Solid-State Laser Arrays; IEEE Journal of Selected Topics in Quantum Electronics; vol. 13, No. 3; pp. 460-472; Jun. 2007.

Goodno, G. D. et al; Active phase and polarization locking of a 1.4 kW fiber amplifier; Optics Letters; vol. 35, No. 10; pp. 1542-1544; May 15, 2010.

Shay, T. M.; Theory of Electronically phased coherent beam combination without a reference beam; Optics Express; vol. 14, No. 25; Dec. 11, 2006; pp. 12188-12195; 2006 OSA.

Vorontsov, M. A. et al; Stochastic parallel-gradient-descent technique for high-resolution wave-front phase-distortion correction; J. Optical Society of America; vol. 15, No. 10; pp. 2745-2758; Oct. 1998.

Redmond, S. et al; Active coherent combination using hill-climbing based algorithms for fiber and semiconductor amplifiers; In Coherent Laser Beam Combining, First Edition, A. Brignon, ed.; 2013 Wiley-VCH Verlag GmbH & Co.; pp. 103-136.

Yu, C. X. et al; Beam Combining; Chapter 19; In High Power Laser Handbook, H. Injeyan and G. D. Goodno, eds.; pp. 533-571; McGraw-Hill, 2011.

\* cited by examiner

MULTICHANNEL CONTROLLER

TECHNICAL FIELD

The present invention relates to control systems; more particularly to controlling a system output by modifying multiple inputs.

BACKGROUND

In many control system applications it is desirable to modify multiple inputs to achieve a desired output characteristic. In systems with a large number of inputs, the control system becomes overly complex.

An example of such a system is coherently beam combined fiber laser arrays being operated in a high vibration environment. Coherent beam combining (CBC) generally requires that the lasers' phases be locked together using a closed-loop servo controller. For optimal packaging, it is advantageous for the controller to lock all the laser channels using only a single optical sample of the combined beam, i.e. to generate a multiplicity of error signals from a single physical measurement. Such multi-channel phase-locking controllers are limited in their scalability to high control speeds and channel counts by the limited information content of a single beam sample. In general, there is a finite trade space for controller speed (bandwidth) against channel count scalability.

Past CBC development work has sought to develop multi-channel phase-locking controllers scalable to large channel count. To maximize channel count scalability, such controller designs are typically optimized for modest control bandwidths focused on removing internal phase noise that is typically dominated by internal coolant flows, generally with low amplitude. However, when fiber amplifiers are operated in vibrationally noisy environments such as on moving air or ground platforms, the internal phase noise can be overshadowed by platform-induced vibrational phase noise. For example, in an environment having 2.4 g random vibration, acoustic frequency (<~10 kHz) phase noise may be on the order of >100's of radians (rad) RMS with RMS phase noise slews (angular frequency shifts) of 600 krad/s, and peak slews of >2 Mrad/s. This is >100× the internal phase noise, and it is well beyond the demonstrated ~few 10s of krad/s controller bandwidth of existing phase-locking controllers such as Locking of Optical Coherence by Single-detector Electronic Frequency Tagging (LOCSET) and Stochastic Parallel Gradient Descent (SPGD).

LOCSET uses multi-frequency dither techniques. In these methods, a small (<<1 radian) phase dither tag is applied at a unique frequency on each laser channel. When the mutually coherent beams are geometrically combined with each other, the resulting interference creates beating in the time domain at the superposition of tagging frequencies. Coherent detection methods can be used to isolate the beat phase at each frequency, and use this as an error signal for feedback control of each channel's phase. As the number of channels in the array is increased, more RF bandwidth is required to accommodate the unique dither frequencies for the new channels. Hence, ultimate scaling is limited by signal-to-noise, since upon adding channels the signal-to-noise of any individual channel's unique dither frequency modulation amplitude is decreased relative to the larger DC background of the combined beam's power and thus indirectly results in a trade of channel count against bandwidth as more averaging is eventually required to recover a measurement associated with a particular channel. LOCSET suffers from the disadvantage of requiring unique frequency RF components for each laser channel.

SPGD is a model-independent controller method that, like LOCSET, has its origins in adaptive optics. It involves applying uncorrelated sets of dither vectors simultaneously (i.e., at the same clock rate) on all laser channels, and simply uses a hill climbing algorithm to maximize the detected power. When the power is maximized, all beams are in phase with one another. SPGD differs fundamentally from LOCSET in that SPGD does not directly detect the phases of each beam, but only maximizes an aggregate metric (the combined power) that depends on the individual phases. SPGD has generally been regarded as delivering inferior performance to LOCSET, both in terms of scaling to higher channels counts and in scaling to higher control bandwidths. Adding more laser channels effectively adds more dimensions to the multi-dimensional hill that needs to be climbed in phase space, so the convergence time increases proportionally to the channel count.

SUMMARY

An embodiment of the present invention provides a high speed multi-channel optical phase locking controller that can accurately phase-lock large arrays of fiber amplifiers without the need for vibration isolation.

Another embodiment of the present invention involves modifying an adjustable characteristic of each of a plurality of inputs using a setpoint belonging to a plurality of setpoints and a dither magnitude belonging to a plurality of dither magnitudes. Each input is modified using a different setpoint belonging to the plurality of setpoints and a different dither magnitude belonging to the plurality of dither magnitudes. This modifying produces a plurality of modified inputs that combine to produce an output. A first measurement of a characteristic of the output associated with the dither magnitude added to the setpoint is obtained, and a second measurement of the characteristic of the output associated with the dither magnitude subtracted from the setpoint is obtained. The first and second measurements are used to calculate a current adjustment value. Each dither magnitude in the plurality of dither magnitudes is modified using the current adjustment value to create a plurality of currently adjusted dither magnitudes. Each currently adjusted dither magnitude belonging to the plurality of currently adjusted dither magnitudes is combined with a corresponding integrated prior adjusted dither magnitude belonging to a plurality of integrated prior adjusted dither magnitudes to create a plurality of setpoint adjustments. The plurality of setpoints is updated by combining each setpoint adjustment belonging to the plurality of setpoint adjustments with a corresponding setpoint belonging to the plurality of setpoints, and the plurality of integrated prior adjusted dither magnitudes is updated by combining each currently adjusted dither magnitude belonging to the plurality of currently adjusted dither magnitudes with the corresponding integrated prior adjusted dither magnitude belonging to the plurality of integrated prior adjusted dither magnitudes.

In yet another embodiment of the present invention, a plurality of input modifiers receive a plurality of inputs and produce a plurality of modified inputs. A combiner produces an output using the plurality of modified inputs. An output detector measures an output characteristic. A processor system communicates with the plurality of input modifiers and the output detector, and a memory stores computer program instructions. The computer program instructions, when executed on the processor system, cause the processor system to perform operations. The operations include modifying an adjustable characteristic of each of the plurality of inputs using a setpoint belonging to a plurality of setpoints and a dither magnitude belonging to a plurality of dither magnitudes. Each input is modified using a different setpoint belonging to the plurality of setpoints and a different dither magnitude belonging to the plurality of dither magnitudes. A first measurement of the output characteristic associated with the dither magnitude added to the setpoint is obtained, and a second measurement of the output characteristic associated with the dither magnitude subtracted from the setpoint is obtained. The first and second measurements are used to calculate a current adjustment value. Each dither magnitude in the plurality of dither magnitudes is modified using the current adjustment value to create a plurality of currently adjusted dither magnitudes. Each currently adjusted dither magnitude belonging to the plurality of currently adjusted dither magnitudes is combined with a corresponding integrated prior adjusted dither magnitude belonging to a plurality of integrated prior adjusted dither magnitudes to create a plurality of setpoint adjustments. The plurality of setpoints is updated by combining each setpoint adjustment belonging to the plurality of setpoint adjustments with a corresponding setpoint belonging to the plurality of setpoints, and the plurality of integrated prior adjusted dither magnitudes is updated by combining each currently adjusted dither magnitude belonging to the plurality of currently adjusted dither magnitudes with the corresponding integrated prior adjusted dither magnitude belonging to the plurality of integrated prior adjusted dither magnitudes.

In still another embodiment of the current invention, a plurality of phase shifters receive a plurality of optical inputs and produce a plurality of phase shifted optical inputs. A combiner produces a combined optical output using the plurality of phase shifted optical inputs. An optical power detector measures an output power of the combined optical output. A processor system communicates with the plurality of phase shifters and the optical power detector, and a memory stores computer program instructions. The computer program instructions when executed on the processor system cause the processor system to perform operations. The operations include modifying a phase of each of the plurality of optical inputs using a setpoint belonging to a plurality of setpoints and a dither magnitude belonging to a plurality of dither magnitudes. Each optical input is phase shifted using a different setpoint belonging to the plurality of setpoints and a different dither magnitude belonging to the plurality of dither magnitudes. A first output power measurement associated with the dither magnitude added to the setpoint is obtained, and a second output power measurement associated with the dither magnitude subtracted from the setpoint is obtained. The first and second output power measurements are used to calculate a current adjustment value. Each dither magnitude in the plurality of dither magnitudes is modified using the current adjustment value to create a plurality of currently adjusted dither magnitudes. Each currently adjusted dither magnitude belonging to the plurality of currently adjusted dither magnitudes is combined with a corresponding integrated prior adjusted dither magnitude belonging to a plurality of integrated prior adjusted dither magnitudes to create a plurality of setpoint adjustments. The plurality of setpoints are updated by combining each setpoint adjustment belonging to the plurality of setpoint adjustments with a corresponding setpoint belonging to the plurality of setpoints, and the plurality of integrated prior adjusted dither magnitudes are updated by combining each currently adjusted dither magnitude belonging to the plurality of currently adjusted dither magnitudes with the corresponding integrated prior adjusted dither magnitude belonging to the plurality of integrated prior adjusted dither magnitudes.

DETAILED DESCRIPTION

Figure 1:
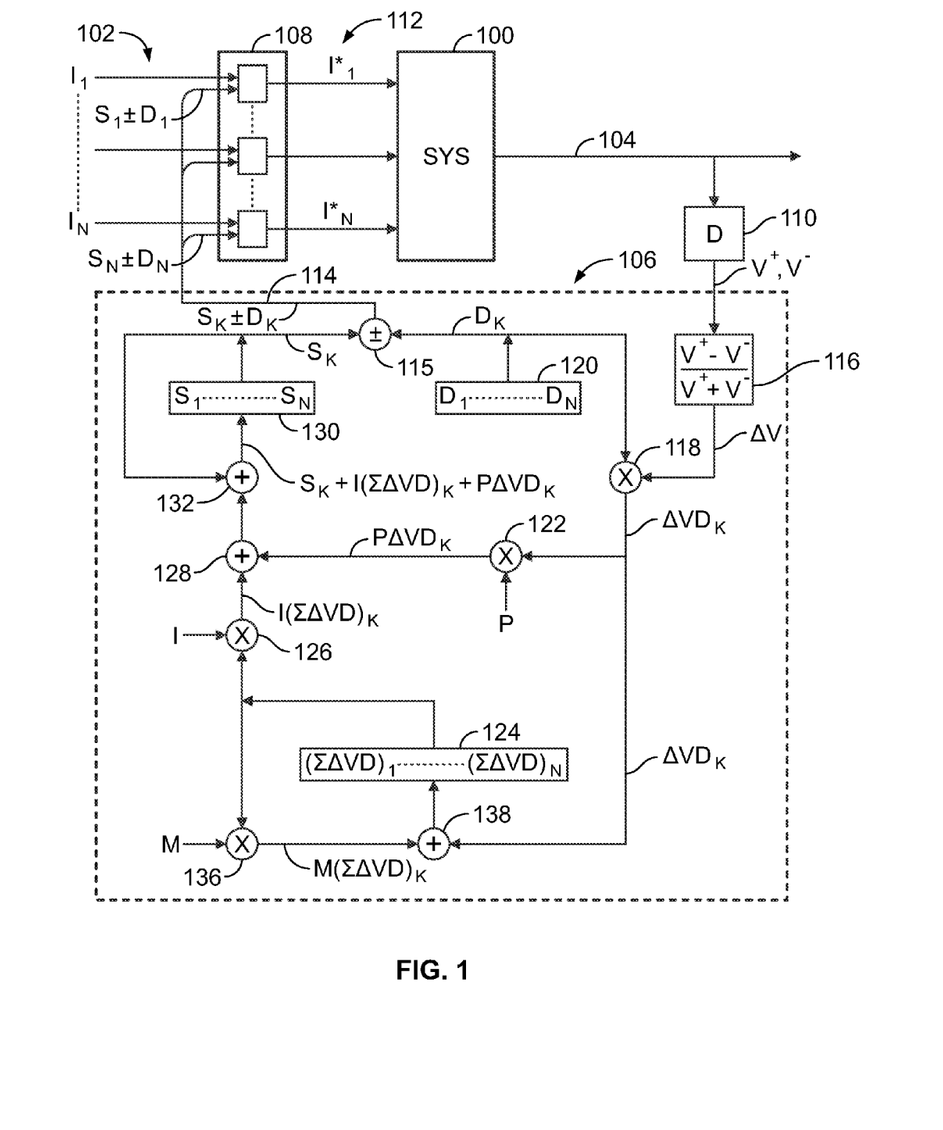
FIG. 1 illustrates using proportional and integral adjusted dither magnitudes to adjust setpoints.

FIG. 1 illustrates system 100 with inputs 102 and output 104. Controller 106 provides control inputs to input modifier 108 in order to modify inputs 102 to system 100. The modifications are made to maximize or minimize a particular output characteristic of output 104. The characteristic of interest of output 104 is measured using detector 110.

System 100 may be any type of system that behaves monotonically. It may combine inputs to produce an output, for example, by summing inputs, taking the product of inputs, convolving inputs or by using a combination of these operations. For example system 100 may be a combustion system with multiple inputs where the output characteristic of interest is temperature. System 100 may also be a coherently beam combined fiber laser array system where the output characteristic of interest is combined optical power. Input modifier 108 may be for example, a fuel valve adjuster, a phase shifter, an amplitude modifier, or a polarization modifier. Detector 110 may be for example a temperature detector that provides a measure of output temperature or an optical power detector that provides a measure of output optical power.

Input modifier 108 modifies N inputs, $I_1, I_k, \ldots I_N$, simultaneously or nearly simultaneously, to create modified inputs 112. The inputs are modified using control signal 114 from adder/subtracter 115. Control signal 114 provides a different control to modify each of the inputs $I_1$ through $I_N$. Each control consists of a current setpoint and a dither magnitude. In each control cycle two modification controls are provided to each input. The first modification control comprises a sum of the setpoint and the dither magnitude, and the second modification control input provides a result of the dither magnitude being subtracted from the setpoint. Therefore, for each control cycle, each input is modified by the setpoint with a plus and minus dither magnitude. The two modification control signals can be represented as:

$$S_k + D_k \text{ and } S_k - D_k \text{ where } k=1 \text{ to } N \text{ and where } S_k \text{ is the current setpoint and } D_k \text{ is the dither magnitude}$$

Figure 2:
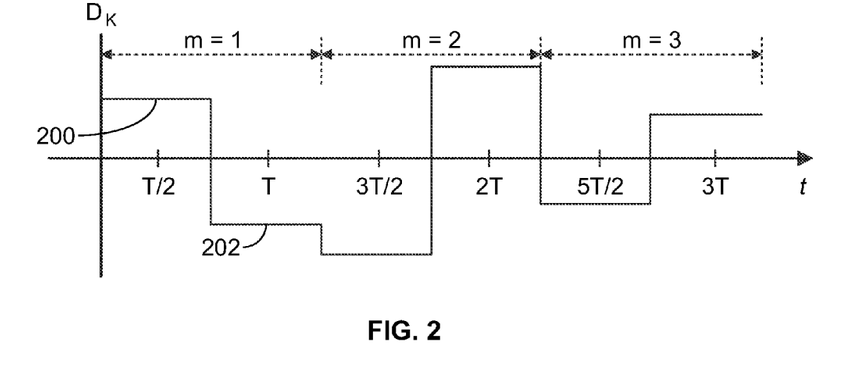
FIG. 2 illustrates dither steps for input k.

FIG. 2 illustrates dither steps $D_k$ used for input $I_k$. Positive dither magnitude 200 is used for half of control cycle m=1 and negative dither magnitude 202 is used for the second half control cycle m=1. It should be noted that the dither magnitudes 200 and 202 are equal in size and only differ in sign. It should also be noted that the dither rate is 1/T and consists of cycling through both the plus and minus magnitude. Additionally, each dither signal has a mean equal to zero, that is, the mean of all dither magnitudes applied to input $I_k$ is zero. Additionally, there is zero correlation between the different dither signals used for each input modification. For example, there is zero correlation between the dither magnitudes provided to inputs $I_k$ and $I_{k+1}$.

For each set of modified inputs, an output 104 is produced. Detector 110 measures the output characteristic of interest for each set of modified inputs. The first measurement $V^+$ is taken when the set of modified inputs results from the original inputs being modified using the setpoint plus the dither magnitude. A second measurement, $V^-$ is taken when the set modified inputs results from the original inputs modified using the setpoint minus the dither magnitude. These measurements are used by processor 116, which calculates the normalized difference between the two measurements. Normalized measurement $\Delta V$ may be expressed as Equation 1.

$$\Delta V = \frac{V^+ - V^-}{V^+ + V^-} \qquad \text{EQ1}$$

Normalized measurement $\Delta V$ is used to multiply each of the dither magnitudes associated with each of the inputs 1 to N. Multiplier 118 multiplies each of the dither magnitudes from memory 120 by the normalized measurement $\Delta V$ to create a collection of current adjusted dither magnitudes. Each of the current adjusted dither magnitudes can be represented as:

$\Delta VD_k$ where $k=1$ to $N$

The current adjusted dither magnitudes are then used to update the current setpoints and to update a collection of integrated prior adjusted dither magnitudes.

Multiplier 122 is used to multiply each current adjusted dither magnitude by a proportional coefficient or value P. This results in a collection of proportionally scaled current adjusted dither magnitudes where each one can be represented as:

$P\Delta VD_k$ where $k=1$ to $N$

A collection of integrated prior adjusted dither magnitudes is stored in memory 124 and each integrated prior adjusted dither magnitude is multiplied by integration coefficient or value I using multiplier 126. This results in a collection of scaled integrated prior adjusted dither magnitudes where each scaled integrated prior adjusted dither magnitude can be represented as:

$I(\Sigma \Delta VD)_k$ where $k=1$ to $N$, and where the summation is over all prior adjusted dither magnitudes for a particular input $k$ Adder 128 sums corresponding proportionally scaled current adjusted dither magnitudes and scaled integrated prior adjusted dither magnitudes to create a collection of setpoint adjustments. Each of the setpoint adjustments can be represented as:

$P\Delta VDk + I(\Sigma \Delta VD)_k$

The current setpoints are stored in memory 130. Summer 132 forms sums of corresponding current setpoints and the corresponding subpoint adjustments provided by summer 128 to create a collection of updated setpoints. The updated setpoints are then stored in memory 130 replacing the current setpoints. The updated setpoints can be represented as:

$S_k + P\Delta VD_k + I(\Sigma \Delta VD)_k$ where $k=1$ to $N$, and where $S_k$ is the current setpoint The collection of integrated prior adjusted dither magnitudes is updated using current adjusted dither magnitudes.

$\Delta VD_k$ where $k=1$ to $N$

Multiplier 136 multiplies each of the integrated prior adjusted dither magnitudes by coefficient or value M. For example, M may have a value <1, such as 0.999. This multiplication results in a collection of scaled integrated prior adjusted dither magnitudes that can be represented as:

$M(\Sigma \Delta VD)_k$ where $k=1$ to $N$, and where the summation is over all prior adjusted dither magnitudes Adder 138 sums corresponding current adjusted dither magnitudes with scaled integrated prior adjusted dither magnitudes to create an updated integrated prior adjusted dither magnitude. The updated values are stored in memory 124. The updated integrated prior adjusted dither magnitudes can be represented as:

$M(\Sigma \Delta VD)_k + \Delta VD_k$ where $k=1$ to $N$

In addition to these updates, memory 120 outputs the next collection of dither magnitudes corresponding to the next control cycle, m+1. Memory 120 is a source of dither values that are pre-programmed and usually do not change dynamically based on measurements $V^+$ and $V^-$.

It should be recalled that for each sequence of dither magnitudes the mean is equal to zero and there is zero correlation between the sequences of dither magnitudes applied to different inputs. A source of dither magnitudes can be, for example, any random or pseudo-random sequence of values. For example, in an analog circuit implementation, a set of thermal noise sources can be used to generate random values, and in a digital circuit implementation, sequences of random or pseudo-random numbers can be pre-calculated and stored in memory. Another source of dither magnitudes can be an orthogonal code such as those used for CDMA applications, e.g. a set of Walsh functions. In the case of CDMA or pseudo-random dithers, the sets can be recycled after a large number of loop cycles, for example, after 10×N loop cycles, where N is the number of inputs.

At this point the process is repeated where the inputs are now modified using the updated setpoints and the new dither magnitudes. Over repeated cycles of applying setpoints modified by a dither, and then updating the setpoints, the setpoints eventually converge to a set of setpoints where the inputs are modified to maximize or minimize the output characteristic of interest. The overall sequence of updating setpoints based on the current adjusted dither magnitudes constitutes a hill-climbing algorithm.

It should be noted that processor 116, the memories, the multipliers, the adders and subtracter may be implemented in discrete hardware, programmable hardware, or one or more processors or computers executing instructions stored on non-transitory medium, or in a processor system contain some or all of these components.

Figure 3:
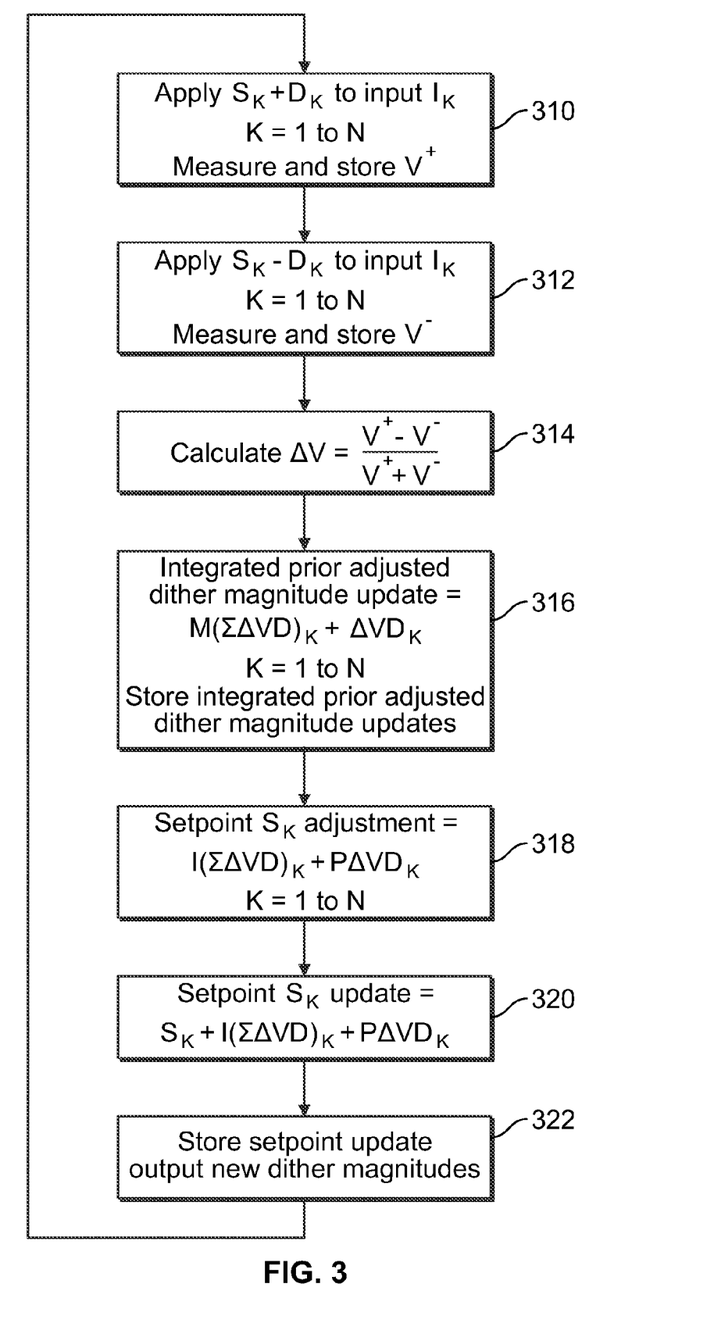
FIG. 3 illustrates the control process.

FIG. 3 illustrates the process steps carried out by controller 106. In step 310, the corresponding current setpoint plus the corresponding dither value is applied to each of inputs 1 through N. The resulting output characteristic of interest $V^+$ is then captured.

In step 312, the corresponding current setpoint less the corresponding dither value is applied to each of inputs 1 through N. The resulting output characteristic of interest $V^-$ is then captured.

In step 314, normalized measurement $\Delta V$ is calculated.

In step 316, integrated prior adjusted dither magnitude updates are created by summing corresponding current adjusted dither magnitudes and integrated prior adjusted dither magnitudes. The integrated prior adjusted dither magnitude updates are then stored in memory 124.

In step 318, the current adjusted dither magnitude and the integrated prior adjusted dither magnitude are used to create a set of setpoint adjustments.

In step 320, the setpoint updates are created by summing corresponding current setpoints and setpoint adjustments.

In step 322, the setpoint updates are stored in memory 130, and a new set of dither magnitudes are outputted from memory 120.

After step 322, the process is repeated by going to step 310.

Figure 4:
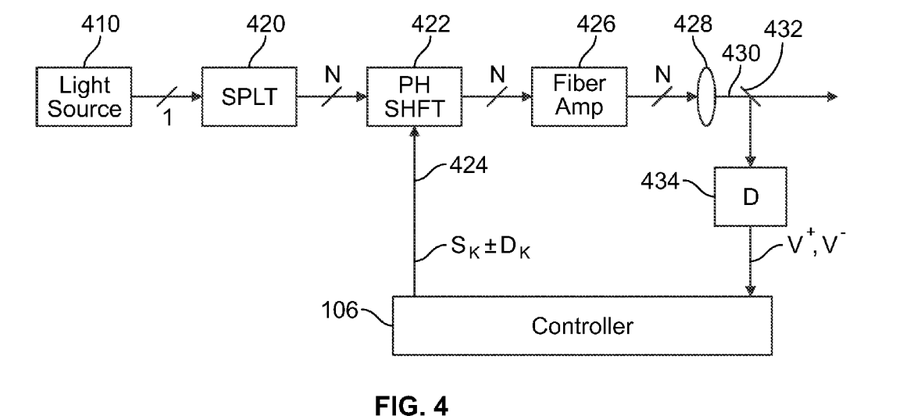
FIG. 4 illustrates controlling input phases in a coherently beam combined fiber laser array system.

FIG. 4 illustrates controlling input phases in a coherently beam combined fiber laser array system. The embodiment illustrated in FIG. 4 may also be implemented using other types of laser arrays such as, for example, solid state laser arrays, gas laser arrays, or semiconductor laser arrays. Light source or seed 410 provides laser light to splitter or coupler 420. Splitter or coupler 420 provides N channels of laser light to phase shifters 422. Phase shifters 422 phase shift each of the individual channels based on control inputs received on control 424. The phase shifted channels are then fed into fiber amplifier array 426. The output of fiber amplifier array 426 is then fed to beam combiner or lens 428. Output 430 from beam combiner 428 is passed through beam splitter 432. A small portion of optical power is diverted to optical power detector 434 by beam splitter 432. Optical power detector 434 provides power measurements to controller 106.

Based on the power measurements $V^+$ and $V^-$ received from optical power detector 434, controller 106 provides control signals to phase shifters 422 through control 424. The control signals consist of a setpoint modified by a dither magnitude. As discussed above, over many cycles of applying different dither magnitudes to the control signals provided to phase shifter 422, the setpoints will converge to values that will maximize the output power of output 430.

For example, in an environment having 2.4 g random vibration, acoustic frequency (<~10 kHz) phase noise may be on the order of hundreds of rad RMS with RMS phase noise slews (angular frequency shifts) of 600 krad/s, and peak slews of >2 Mrad/s. As an example, in order to maximize the power of output 430 in this type of environment the dither rate may be 100 MHz with an RMS magnitude of 0.1 radians. Additionally, the values for P and I may be selected based on the number of channels or inputs N, and the data latency time (optical+electronic time-of-flight around the loop, including processing time). For example, for N=100 channels and data latency time=650 ns, the values of P and I may be P=3 and I=0.01. The values of P and I may also be determined using well known methods such as, for example, the Ziegler-Nichols method.

The methods or functions described hereinabove may be executed through the use of dedicated hardware as well as hardware capable of executing software in association with appropriate software. When provided by a processor or controller, the corresponding methods or functions may be provided by a single dedicated processor or controller, by a single shared processor or controller, or by a plurality of individual processors or controllers, some of which may be shared. Processors or controllers may be implemented as hardware capable of executing software, and may also be implemented using devices that include, for example and without limitation, digital signal processor (DSP) hardware, network processor, application specific integrated circuit (ASIC), field programmable gate array (FPGA), operation specific hardware such as multipliers or adders, read-only memory (ROM) for storing software, random access memory (RAM), and non-volatile storage.

An embodiment of the present invention may be implemented as a computer program comprising sequences of machine-executable instructions, which may be used to cause a machine, such as a general-purpose or special-purpose processor or logic circuits programmed with the instructions to execute the instructions. For example, a computer program on or within an information medium such as a non-transitory medium, suitable to implement this embodiment of the invention. The medium may include, for example, CD-ROMs or other type of optical disks, magnetic disks, magnetic drives, optical drives, solid state drives, ROMs, RAMs, EPROMs, EEPROMs, magnetic or optical cards, flash memory, or other types of machine-read-able mediums suitable for storing electronic instructions. The program may use any programming language, and be in the form of source code, object code, or intermediate code between source code and object code, such as in a partially compiled form, or in any other form desirable for implementing the invention.

In the foregoing description, for the purposes of illustration, methods were described in a particular order. It should be appreciated that in alternate embodiments, the methods may be performed in a different order than that described. Additionally, the methods may include fewer, additional, or different blocks than those described.

What is claimed is:

1. A method of output control, comprising the steps of:
    modifying an adjustable characteristic of each of a plurality of inputs using a setpoint belonging to a plurality of setpoints and a dither magnitude belonging to a plurality of dither magnitudes, each input being modified using a different setpoint belonging to the plurality of setpoints and a different dither magnitude belonging to the plurality of dither magnitudes, the modifying resulting in a plurality of modified inputs;
    obtaining a first measurement of a characteristic of an output associated with the dither magnitude added to the setpoint, the output resulting from a combination using the plurality of modified inputs;
    obtaining a second measurement of the characteristic associated with the dither magnitude subtracted from the setpoint;
    using the first and second measurements to calculate a current adjustment value;
    modifying each dither magnitude in the plurality of dither magnitudes using the current adjustment value to create a plurality of currently adjusted dither magnitudes;
    combining each currently adjusted dither magnitude belonging to the plurality of currently adjusted dither magnitudes with a corresponding integrated prior adjusted dither magnitude belonging to a plurality of integrated prior adjusted dither magnitudes to create a plurality of setpoint adjustments; and
    updating the plurality of setpoints by combining each setpoint adjustment belonging to the plurality of setpoint adjustments with a corresponding setpoint belonging to the plurality of setpoints.

2. The method of claim 1, further comprising the step of:
    updating the plurality of integrated prior adjusted dither magnitudes by combining each currently adjusted dither magnitude belonging to the plurality of currently adjusted dither magnitudes with the corresponding integrated prior adjusted dither magnitude belonging to the plurality of integrated prior adjusted dither magnitudes.

3. The method of claim 1, wherein the step of using the first and second measurements to calculate a current adjustment value comprises using a difference of the first measurement and the second measurement, and a sum of the first measurement and the second measurement.

4. The method of claim 1, wherein the step of modifying each dither magnitude comprises multiplying each dither magnitude by the current adjustment value.

5. The method of claim 1, wherein the step of combining each currently adjusted dither magnitude comprises multiplying each currently adjusted dither magnitude by a first value and each integrated prior adjusted dither magnitudes by a second value.

6. An apparatus, comprising:
a plurality of input modifiers that receive a plurality of inputs and produce a plurality of modified inputs;
a combiner that produces an output using the plurality of modified inputs;
an output detector that measures an output characteristic;
a processor system in communication with the plurality of input modifiers and the output detector; and
a memory to store computer program instructions, the computer program instructions when executed on the processor system cause the processor system to perform operations comprising:
modifying an adjustable characteristic of each of the plurality of inputs using a setpoint belonging to a plurality of setpoints and a dither magnitude belonging to a plurality of dither magnitudes, each input being modified using a different setpoint belonging to the plurality of setpoints and a different dither magnitude belonging to the plurality of dither magnitudes;
obtaining a first measurement of the output characteristic associated with the dither magnitude added to the setpoint;
obtaining a second measurement of the output characteristic associated with the dither magnitude subtracted from the setpoint;
using the first and second measurements to calculate a current adjustment value;
modifying each dither magnitude in the plurality of dither magnitudes using the current adjustment value to create a plurality of currently adjusted dither magnitudes;
combining each currently adjusted dither magnitude belonging to the plurality of currently adjusted dither magnitudes with a corresponding integrated prior adjusted dither magnitude belonging to a plurality of integrated prior adjusted dither magnitudes to create a plurality of setpoint adjustments;
updating the plurality of setpoints by combining each setpoint adjustment belonging to the plurality of setpoint adjustments with a corresponding setpoint belonging to the plurality of setpoints.

7. The apparatus of claim 6, wherein the processor system comprises a single processor.

8. The apparatus of claim 6, wherein the processor system comprises a plurality of processors.

9. The apparatus of claim 6, wherein the processor system comprises at least one processor and at least one operation specific hardware component.

10. The apparatus of claim 6, wherein the processor system performed operations further comprise updating the plurality of integrated prior adjusted dither magnitudes by combining each currently adjusted dither magnitude belonging to the plurality of currently adjusted dither magnitudes with the corresponding integrated prior adjusted dither magnitude belonging to the plurality of integrated prior adjusted dither magnitudes.

11. The apparatus of claim 6, wherein a difference of the first measurement and the second measurement, and a sum of the first measurement and the second measurement are used to calculate a current adjustment value.

12. The apparatus of claim 6, wherein each dither magnitude is modified by multiplying each dither magnitude by the current adjustment value.

13. The apparatus of claim 6, wherein as part of combining each currently adjusted dither magnitude with a corresponding integrated prior adjusted dither magnitude, each currently adjusted dither magnitude is multiplied by a first value and each integrated prior adjusted dither magnitudes is multiplied by a second value.

14. An apparatus, comprising:
a plurality of phase shifters that receive a plurality of optical inputs and produce a plurality of phase shifted optical inputs;
a combiner that produces a combined optical output using the plurality of phase shifted optical inputs;
an optical power detector that measures an output power of the combined optical output;
a processor system in communication with the plurality of phase shifters and the optical power detector; and
a memory to store computer program instructions, the computer program instructions when executed on the processor system cause the processor system to perform operations comprising:
modifying a phase of each of the plurality of optical inputs using a setpoint belonging to a plurality of setpoints and a dither magnitude belonging to a plurality of dither magnitudes, each optical input being phase shifted using a different setpoint belonging to the plurality of setpoints and a different dither magnitude belonging to the plurality of dither magnitudes;
obtaining a first output power measurement associated with the dither magnitude added to the setpoint;
obtaining a second output power measurement associated with the dither magnitude subtracted from the setpoint;
using the first and second output power measurements to calculate a current adjustment value;
modifying each dither magnitude in the plurality of dither magnitudes using the current adjustment value to create a plurality of currently adjusted dither magnitudes;
combining each currently adjusted dither magnitude belonging to the plurality of currently adjusted dither magnitudes with a corresponding integrated prior adjusted dither magnitude belonging to a plurality of integrated prior adjusted dither magnitudes to create a plurality of setpoint adjustments;
updating the plurality of setpoints by combining each setpoint adjustment belonging to the plurality of setpoint adjustments with a corresponding setpoint belonging to the plurality of setpoints.

15. The apparatus of claim 14, wherein the processor system comprises a single processor.

16. The apparatus of claim 14, wherein the processor system comprises a plurality of processors.

17. The apparatus of claim 14, wherein the processor system comprises at least one processor and at least one operation specific hardware component.

18. The apparatus of claim 14, wherein the processor system performed operations further comprise updating the plurality of integrated prior adjusted dither magnitudes by combining each currently adjusted dither magnitude belonging to the plurality of currently adjusted dither magnitudes with the corresponding integrated prior adjusted dither magnitude belonging to the plurality of integrated prior adjusted dither magnitudes.

19. The apparatus of claim 14, wherein a difference of the first measurement and the second measurement, and a sum of the first measurement and the second measurement are used to calculate a current adjustment value.

20. The apparatus of claim 14, wherein as part of combining each currently adjusted dither magnitude with a corresponding integrated prior adjusted dither magnitude, each currently adjusted dither magnitude is multiplied by a first value and each integrated prior adjusted dither magnitudes is multiplied by a second value.

\* \* \* \* \*